United States Patent [19]

Kaetsu et al.

[11] Patent Number: 4,904,708

[45] Date of Patent: Feb. 27, 1990

[54] METHOD OF MANUFACTURING SOFT CONTACT LENS MATERIAL

[75] Inventors: Isao Kaetsu, Takasaki; Minoru Kumakura, Maebashi; Hidenari Suyama, Yokohama; Nobuo Kameda, Tokyo; Hideo Kouyama, Ohmiya, all of Japan

[73] Assignees: Japan Atomic Energy Research Institute; Kabushiki Kaisha Tokyo Contact Lens Kenkyusho, both of Tokyo, Japan

[21] Appl. No.: 205,624

[22] Filed: May 31, 1988

Related U.S. Application Data

[63] Continuation of Ser. No. 912,366, Sep. 12, 1986, abandoned.

[30] Foreign Application Priority Data

Sep. 25, 1985 [JP] Japan .................................. 60-210171

[51] Int. Cl.$^4$ ............................................... C08F 2/54
[52] U.S. Cl. ........................................,. 522/5; 522/84; 523/106; 264/1.4
[58] Field of Search .......................... 264/1.4; 523/106; 522/5, 84

[56] References Cited

U.S. PATENT DOCUMENTS

| | | | |
|---|---|---|---|
| 3,660,545 | 5/1972 | Wichterle | 264/1.4 |
| 4,010,088 | 3/1977 | Okubo | 522/5 |
| 4,056,496 | 11/1977 | Mancini | 523/106 |
| 4,138,300 | 2/1979 | Kaetsu | 522/5 |
| 4,379,864 | 4/1983 | Gallop | 523/106 |
| 4,411,754 | 10/1923 | Kaetsu | 522/123 |
| 4,450,262 | 5/1984 | Drake | 523/106 |
| 4,495,313 | 1/1985 | Larsen | 523/106 |

FOREIGN PATENT DOCUMENTS

1417396 12/1975 United Kingdom .................... 522/5

OTHER PUBLICATIONS

Sartomer Advertisement Poster: ARCO.

*Primary Examiner*—John C. Bleutge
*Assistant Examiner*—David Btutner
*Attorney, Agent, or Firm*—Christensen, O'Connor, Johnson & Kindness

[57] ABSTRACT

Hydrophilic monomers in a supercooled, transparent state, are polymerized in the presence of water. The polymers have low levels of residual monomers and exhibit good mechanical strength. The process provides materials useful as contact lenses.

5 Claims, No Drawings

METHOD OF MANUFACTURING SOFT CONTACT LENS MATERIAL

This application is a continuation application of Ser. No. 912,366, filed Sept. 25, 1986, now abandoned.

The present invention relates to a process for preparing base material of soft contact lens and, more particularly to a method of manufacturing soft contact lens material by utilizing radiation.

As the base material of soft contact lens, the water-absorptive material of hydrophilic resins adapted to supply cornea with oxygen and non-water-absorptive material of hydrophobic resins such as silicon rubber are well known. However, the water-absorptive resins are most commonly used today as the base material of soft contact lens.

Conventional water-absorptive resins for such purpose include polymers or copolymers of hydroxyethylmetacrylate and N-vinyl-pyrrolidone, or copolymers of these polymers or copolymers with methylmethacrylate or acrylic acid, and these polymers are prepared by the catalytic polymerization in which the above-mentioned monomers are heated in the presence of suitable catalyst added thereto.

For the water-absorptive base material of soft contact lens, high mechanical strength such as a tensile strength, a tear strength and a surface hardness are required so that the base material may be free from any crack and damage in its water-impregnated state. To meet this requirement, a quantity of residual non-reacted monomers in the polymers must be minimized and, at the same time, a volume contraction occurring during polymerization must be also reduced to minimize residual distortion and stress in the polymers.

However, with such catalytic polymerization it is very difficult to reduce such residual monomers below a certain quantity. Furthermore, it is also extremely difficult to avoid distortion and stress developing due to the volume contraction, since a certain degree of said volume contraction is inevitable with this catalytic polymerization which is effected at a relatively high temperature.

Such water-absorptive soft contact lens has usually been formed by machining a piece of non-water-impregnated polymer with a consideration of expansion due to water-absorption so that a desired dimension is obtained in its water-impregnated state, and it is important that no deformation occurs during polymerization utilizing a mold and thereafter a predetermined operation of machining can easily provide the product of a given shape with a desired dimensional accuracy. In addition, it is also essential that there occur no variations leading to a damage for optical properties, such as opacification and coloration during polymerization. However, the catalytic polymerization conducted at a relatively high temperature is apt to induce said deformation and coloration, and to avoid them, production of the soft contact lens has usually been performed through disadvantageously time-consuming procedures at the cost of efficiency. Nevertheless, it has been difficult to eliminate both the deformation and the coloration.

An object of the present invention is to eliminate the above-mentioned drawbacks of the well-known process for preparing base material of soft contact lens, and more specifically to provide the base material having high mechanical strength by minimizing a quantity of residual non-reacted monomers in polymers as well as by minimizing a volume contraction possibly taking place during polymerization so as to minimize residual distortion and stress in the polymers, and thereby to provide the base material having a high dimensional accuracy in its water-impregnated state after machined into the contact lens.

SUMMARY OF THE INVENTION

The inventors have devoted themselves to efforts to achieve the above-mentioned object and found that, when polymerization of hydrophilic monomer is accomplished by suitable radiation in the presence of water while the monomer is kept in supercooled transparent state, the polymer as the base material is obtained, which minimizes volume contraction and deformation during polymerization, and provides a high dimensional accuracy in water-impregnated state after machined into the contact lens with extremely low residual stress as well as residual monomer content. Further, the reaction is completed in a very short time.

Specifically, the present invention provides a process for preparing base material of soft contact lens characterized in that one or more kinds of hydrophilic monomer which can be supercooled, or a mixture of said hydrophilic monomer and other monomer, is subjected to polymerization or copolymerization by ionizing radiation in the presence of water of 0.1 to 20% by weight with respect to a total quantity of said monomers while being kept in a supercooled transparent state.

DETAILED DESCRIPTION OF THE INVENTION

Study has been widely made to accomplish polymerization of polymerizable monomers by ionizing radiation and it has also been well known that such irradiated polymerization is achieved at a relatively low temperature. However, none of prior arts suggests preparation of base material for contact lens through the irradiated polymerization of polymerizable monomer in the presence of water while said monomer is kept in supercooled state.

The term "supercooled state" used herein indicates a state in which a polymerizable monomer is kept in non-crystalline even when cooled at a temperature lower than its solidifying point, inclusive not only of the liquid phase state but also the glassy, i.e., amorphous state, so far as it is in a transparent state.

The hydrophilic monomers which can be supercooled and useful for the present invention include ester compounds of polyalcohol and acrylic or methacrylic acid, or derivatives thereof, typically selected from a group consisting of hydroxyethylacrylate, hydroxyethylmethacrylate, hydroxypropylacrylate, hydroxypropylmethacrylate, polyethylene glycol acrylate, polyethylene glycol methacrylate, polyethylene glycol diacrylate, polyethylene glycol dimethacrylate, methoxypolyethylene glycol acrylate and methoxypolyethylene glycol methacrylate. These hydrophilic monomers may be used independently or in mixture thereof, or in mixture with other monomers than those as set forth above and which are being copolymerizable with these hydrophilic monomers.

The monomers which are copolymerizable with the above-mentioned hydrophilic monomers typically include hydrophilic monomers such as acrylamide, methacrylamide, diacetonacrylamide, diacetonmethacrylamide, dimethylacrylamide, dimethylmethacrylamide, N-vinylpyrrolidone, acrylic acid and methacrylic acid; and hydrophobic monomers such as (cyclo)alkylacrylate, (cyclo) alkylmethacrylate, allylacrylate, allylmethacrylate, hexanediolacrylate, hexanediolmethacrylate, diethylene glycol diacrylate, diethylene glycol dimethacrylate, tetraethylene glycol diacrylate and tetraethylene glycol dimethacrylate. A quantity of such monomers is preferably less than 50% by weight with respect to the hydrophilic monomers which can be supercooled. An addition of such monomers exceeding this percentage might result in producing an opacified state in the supercooled state and therefore can not be kept in transparent state.

Any types of radiation may be used in the present invention so far as they present ionizing property. For example, $\alpha$-, $\beta$-, $\gamma$-, X-rays, electron-rays emitted from an electron accelerator, mixed radiations including neutron-ray emitted from a nuclear reactor and UV-ray may be used, but $\gamma$-, X- and electron-rays are preferable and particularly the $\gamma$-rays are preferable in view of their dose rate and transmissivity. Specifically, it is optimal to use the $\gamma$-rays emitted from cobalt 60, cesium 137 and the like. Dose of irradiation depends upon the particular composition of used monomers and typically lies within a range from $1 \times 10^4$ to $1 \times 10^7$ rads and preferably within a range from $1 \times 10^5$ to $5 \times 10^6$ rads from the viewpoint of the polymerization velocity and prevention of polymer coloration. The dose rate preferably lies within a range from $1 \times 10^4$ to $2 \times 10^6$ rads/hour and particularly within a range from $5 \times 10^4$ to $2 \times 10^6$ rads/hour so that occurrence of distortion and stress may be minimized to obtain a desired base material of contact lens with minimized deformation and coloration.

The temperature at which the irradiation is performed depends on the type of hydrophilic monomers to be supercooled and is selected so that the supercooled state may be kept without opacification. In view of the polymerization velocity as well as coloration and deformation of polymers, this temperature is preferably selected within a range from $-100°$ C. to $0°$ C. and more preferably within a range from $-80°$ C. to $-30°$ C. A temperature higher than such range might be apt to cause coloration and deformation of the polymer while a temperature lower than this range might inconveniently reduce the polymerization velocity.

With the present invention, a good result may be obtained even when monomers are in liquid phase in their supercooled state. However, to obtain the optimal result, it is preferable to irradiate monomers in amorphous solid phase, e.g., in glassy state, with suitable radiation.

A quantity of water to be added to monomers is preferably within a range from 0.1 to 20% by weight with respect to a total quantity of monomers. A quantity smaller than this range could not provide a desired result in aspects of reaction promoting effect, minimization of residual monomers, volume contraction during polymerization and dimensional accuracy of finished contact lens, while a quantity higher than said range might cause a phase separation due to crystallization of water at a low temperature and deterioration of mechanical properties.

According to the present invention, the hydrophilic monomer which can be supercooled, or a mixture of monomers containing such hydrophilic monomer, is subjected to rapid cooling in the presence of a predetermined amount of water, thereby to produce a supercooled transparent state, and, while keeping the supercooled transparent state, monomers are irradiated with suitable ionizing radiation to effect polymerization. This polymerization is completed in a short time so as to provide a polymer containing a negligible quantity of residual monomers. Such polymerization with radiation is usually completed in a time as short as 1 to 5 hours. This polymerization velocity is further accelerated according to the present invention, probably because the irradiation is made in the presence of water and radicals produced from irradiated water decomposition might have contributed to acceleration of polymerization. Irradiation at a low temperature reduces the volume contraction and such volume contraction and deformation are further remarkably reduced under a swelling effect of water so as to provide the polymer with minimized distortion and residual stress, and, at the same time, improve the dimensional accuracy after machined into a contact lens and impregnated with water.

EXAMPLES

Now several examples of the present invention will be described, but the present invention is not limited to these examples. It should be understood that the "part" is given as the part by weight in the following examples and controls and the oxygen transmission coefficient is given in unit of $cm^3 \cdot cm/cm^2 \cdot sec \cdot mm$ Hg.

EXAMPLE 1:

80 parts of hydroxyethylmethacrylate, 20 parts of hydroxypropylmethacrylate, 3 parts of water and 3 parts of ethylene glycol methacrylate were mixed together, and the mixture was poured into a test tube (1.8 cm$\phi \times$ 16 cm) and then supercooled at $-50°$ C. to establish a supercooled transparent state. Keeping this state, the mixture was polymerized by $\gamma$-rays emitted from cobalt 60 at a rate of $1.5 \times 10^6$ rads/hour by $4.5 \times 10^6$ rads in total and a colorless, transparent water-containing copolymer was obtained. Volume contraction during polymerization was 8.5%. Water content of this water-containing copolymer was 40% by weight and oxygen transmission coefficient thereof in its water-impregnated state was $16.4 \times 10^{-11}$ on a disc of 0.14 mm thickness. Polymerization yield was 99.9% and residual non-reacted monomer could not be detected by a spectrophotometric measurement of absorbance at the UV range.

The copolymer thus obtained was machined into a contact lens and a base curve radius in the water-impregnated state was measured. Dimensional errors of the measured radius of curvature from its set value are indicated in Table 1.

CONTROL 1:

Polymerization was made in the same manner as in Example 1 except that no water was added. The copolymer thus obtained was colorless and transparent and the volume contraction during polymerization was 9.7%. The water content of this copolymer was 40% by weight and the oxygen transmission coefficient thereof in the fully water-impregnated state was $15.8 \times 10^{-11}$ on a disc of 0.15 mm thickness. The polymerization yield was 99.8% and the residual non-reacted monomer could not be detected by the spectrophotometric measurement of absorbance at the UV range.

The copolymer thus obtained was machined into a contact lens and a base curve radius in the water-impregnated state was measured. Dimensional errors of the measured radius of curvature from its set value are indicated in Table 1.

TABLE 1

| Case water | Base Curve Radius (mm) | | | |
|---|---|---|---|---|
| | Example 1 added | | Control 1 not added | |
| set values | 8.80 | 9.00 | 8.80 | 9.00 |
| measured values | 8.75 | 9.03 | 8.88 | 8.98 |
| | 8.83 | 8.98 | 8.92 | 9.10 |
| | 8.84 | 9.00 | 8.84 | 9.08 |
| | 8.78 | 9.02 | 8.78 | 9.04 |
| dimensional errors | −0.05∼ +0.04 | −0.02∼ +0.03 | −0.02∼ +0.12 | −0.02∼ +0.10 |

Comparison of Example 1 with Control 1 indicates that the polymerization in the presence of water further reduces the volume contraction during polymerization, achieves a higher polymerization yield and improves the dimensional accuracy in water-impregnated state after machined into a contact lens.

EXAMPLE 2:

70 parts of hydroxyethylmethacrylate, 30 parts of hydroxypropylmethacrylate, 5 parts of water and 5 parts of ethylene glycol dimethacrylate were mixed together, the mixture was poured into a test tube (1.8cm$\phi$×16 cm), and then supercooled at −78° C. to establish a supercooled transparent state. In this state, the mixture was polymerized by $\gamma$-rays emitted from cobalt 60 at a rate of $5\times10^5$ rads/hour by $2.5\times10^6$ rads in total, and a colorless, transparent water-containing copolymer was obtained. Water content of this water-containing copolymer was 37% by weight and oxygen transmission coefficient thereof in its fully water-impregnated state was $15.3\times10^{-11}$ on a disc of 0.15 mm thickness. Polymerization yield was 99.8% and the residual non-reacted monomer could not be detected by the measurement in the same manner as in Example 1.

EXAMPLE 3:

80 parts of hydroxyethylmethacrylate, 5 parts of dimethylacrylamide, 8 parts of water and 3 parts of triethylene glycol dimethacrylate were mixed together, the mixture was poured into a test tube (1.8cm$\phi$×16 cm) and then supercooled at −50° C. to establish a supercooled transparent state. In this state, the mixture was polymerized by $\gamma$-rays emitted from cobalt 60 at a rate of $7.0\times10^5$ rads/hour by $3.0\times10^6$ rads in total. Thus, a colorless, transparent water-containing copolymer was obtained. Water content of this water-containing copolymer was 45% by weight and oxygen transmission coefficient in its fully water-impregnated state was $23.5\times10^{-11}$ on a disc of 0.15 mm thickness. Polymerization yield was 99.9% and the residual non-reacted monomer could not be detected by the measurement in the same manner as in Example 1.

EXAMPLE 4:

70 parts of N-vinylpyrrolidone, 10 parts of hydroxyethylmethacrylate, 20 parts of cyclohexylmethacrylate, 3 parts of water and 1.5 parts of allylmethacrylate were mixed together, the mixture was poured into a test tube (1.8cm$\phi$×16 cm), then supercooled at −64° C. to establish a supercooled transparent state. In this state, the mixture was polymerized by $\gamma$-rays emitted from cobalt 60 at a rate of $2.5\times10^5$ rads/hour by $1.0\times10^6$ in total, and a colorless, transparent water-containing copolymer was obtained. Water content of this water-containing copolymer was 70% by weight and oxygen transmission coefficient in its fully water-impregnated state was $48.3\times10^{-11}$ on a disc of 0.13 mm thickness. Polymerization yield was 99.4% and the residual non-reacted monomer could not be detected by the measurement in the same manner as in Example 1.

CONTROL 2:

75 parts of hydroxyethylmethacrylate, 20 parts of hydroxypropylmethacrylate, 5 parts of methylmethacrylate and 0.06 parts of azobisisobutyronitril were mixed together, the mixture was poured into a test tube (1.8cm$\phi$×16 cm), polymerized in a thermostatic tank at 65° C., then polymerized at 90° C. for 48 hours, and a colorless, transparent copolymer was obtained. Volume contraction during polymerization was 19.5%. Water content of this copolymer was 40% by weight and oxygen transmission coefficient thereof in its fully water-impregnated state was $14.8\times10^{-11}$ on a disc of 0.15 mm thickness. Residual non-reacted monomer was detected by the measurement in the same manner as in Example 1 and polymerization yield was 96.5%.

What is claimed is:

1. Process for preparing base material of soft contact lens characterized in that water is added to one or more kinds of hydrophilic monomer which can be supercooled or a mixture of said hydrophilic monomer and other monomer, subjecting the mixture to polymerization or copolymerization by ionizing radiation while keeping said monomer(s) and water in supercooled transparent state, said water being added in an amount of 0.1 to 4.8% based on the total quantity of monomers.

2. Process for preparing base material of soft contact lens as defined in claim (1), wherein said hydrophilic monomer which can be supercooled is ester compound of polyalcohol and acrylic or methacrylic acid.

3. Process for preparing base material of soft contact lens as defined in claim (2), wherein said ester compound is selected from a group consisting of hydroxyethylacrylate, hydroxyethylmethacrylate, hydroxypropylacrylate, hydroxypropylmethacrylate, polyehtylene glycol acrylate, polyethylene glycol methacrylate, polyethylene glycol diacrylate, polyethylene glycol dimethacrylate, methoxypolyethylene glycol acrylate, and methoxypolyethylene glycol methacrylate.

4. Process for preparing base material of soft contact lens as defined in claim (1), wherein polymerization by ionizing radiation takes place at a temperature within a range from −100° C. to 0° C.

5. Process for preparing base material of soft contact lens characterized in that water is added to one or more kinds of hydrophilic monomer which can be supercooled or a mixture of said hydrophilic monomer and other monomer, subjecting the mixture to polymerization or copolymerization by ionizing radiation while keeping said monomer(s) and water in a supercooled transparent state, said water being added in an amount of 0.1 to 3.0% based on the total quantity of monomers.

* * * * *

UNITED STATES PATENT AND TRADEMARK OFFICE
CERTIFICATE OF CORRECTION

PATENT NO. : 4,904,708
DATED : February 27, 1990
INVENTOR(S) : Kaetsu et al.

It is certified that error appears in the above-identified patent and that said Letters Patent is hereby corrected as shown below:

| Column | Line(s) | |
|---|---|---|
| 1 | 7 & 8 | "process for preparing base material of soft contact lens" should be --method of manufacturing soft contact lens material-- |
| 1 | 9 & 10 | "method of manufacturing soft contact lens material" should be --process for preparing base material of water-absorptive soft contact lens-- |
| 5 | 12 & 13 | "$-0.05\sim$ $-0.02\sim$ $-0.02\sim$ $-0.02\sim$" should be ---0.05 -0.02 -0.02 -0.02-- $\int$ $\int$ $\int$ $\int$ |
| 6 | 45 & 46 | "polyehty-lene" should be --polyethylene-- |

Signed and Sealed this

Twenty-fifth Day of June, 1991

Attest:

HARRY F. MANBECK, JR.

Attesting Officer

Commissioner of Patents and Trademarks